United States Patent
Sawada

(10) Patent No.: US 10,845,236 B2
(45) Date of Patent: Nov. 24, 2020

(54) ELECTRONIC SCALE AND DISPLAY METHOD OF DISPLAY UNIT THEREOF

(71) Applicant: SHINKO DENSHI CO., LTD., Tokyo (JP)

(72) Inventor: Masato Sawada, Tokyo (JP)

(73) Assignee: SHINKO DENSHI CO., LTD., Tokyo (JP)

( * ) Notice: Subject to any disclaimer, the term of this patent is extended or adjusted under 35 U.S.C. 154(b) by 213 days.

(21) Appl. No.: 16/306,665

(22) PCT Filed: Jun. 10, 2016

(86) PCT No.: PCT/JP2016/067348
§ 371 (c)(1),
(2) Date: Dec. 3, 2018

(87) PCT Pub. No.: WO2017/212633
PCT Pub. Date: Dec. 14, 2017

(65) Prior Publication Data
US 2019/0293481 A1    Sep. 26, 2019

(51) Int. Cl.
*G01G 21/28* (2006.01)
*G01G 23/01* (2006.01)
*G01G 23/16* (2006.01)
*G01G 23/37* (2006.01)

(52) U.S. Cl.
CPC .......... *G01G 23/163* (2013.01); *G01G 21/283* (2013.01); *G01G 23/16* (2013.01); *G01G 23/3707* (2013.01)

(58) Field of Classification Search
CPC ..... G01G 21/01; G01G 23/163; G01G 21/283; G01G 23/16; G01G 23/3707
See application file for complete search history.

(56) References Cited

U.S. PATENT DOCUMENTS

| | | | | | |
|---|---|---|---|---|---|
| 4,447,885 | A | * | 5/1984 | Biss | G01G 19/414 702/129 |
| 4,751,661 | A | * | 6/1988 | Amacher | G01G 23/3707 177/3 |
| 4,840,239 | A | * | 6/1989 | Slagg | G01G 15/001 177/1 |

(Continued)

FOREIGN PATENT DOCUMENTS

| | | |
|---|---|---|
| JP | 2001-228014 A | 8/2001 |
| JP | 2003-4518 A | 1/2003 |

(Continued)

OTHER PUBLICATIONS

International Search Report dated Jul. 19, 2016, issued in counterpart application No. PCT/JP2016/067348 (1 page).

*Primary Examiner* — Randy W Gibson
(74) *Attorney, Agent, or Firm* — Westerman, Hattori, Daniels & Adrian, LLP

(57) ABSTRACT

An electronic scale includes a display unit for digitally displaying the weight of a load on a weighing dish, a tare subtraction key, a display control unit for controlling the display on the display unit and a memory for memorizing a zero adjustment range. The display control unit displays on the display unit a tare subtraction prompt display for prompting to push the tare subtraction key when the measurement value of the load increases over the upper limit of the zero adjustment range.

11 Claims, 13 Drawing Sheets

(56) References Cited

U.S. PATENT DOCUMENTS

| | | | | |
|---|---|---|---|---|
| 4,907,179 | A * | 3/1990 | Oldendorf | G01G 23/16 |
| | | | | 177/25.13 |
| 4,911,256 | A * | 3/1990 | Attikiouzel | G01G 3/147 |
| | | | | 177/25.16 |
| 5,832,417 | A * | 11/1998 | Petrucelli | G01G 23/01 |
| | | | | 702/101 |
| 6,989,494 | B2 * | 1/2006 | Yagioka | G01G 19/44 |
| | | | | 177/25.13 |
| 7,138,585 | B2 * | 11/2006 | Kohn | G01G 19/44 |
| | | | | 177/25.13 |
| 7,633,018 | B2 | 12/2009 | Leisinger et al. | |
| 8,707,753 | B2 * | 4/2014 | Date | G01G 19/50 |
| | | | | 73/1.13 |
| 9,645,007 | B2 * | 5/2017 | Wallace | G01G 17/00 |
| 2014/0318874 | A1 * | 10/2014 | Moses | G01G 19/414 |
| | | | | 177/1 |

FOREIGN PATENT DOCUMENTS

| | | | |
|---|---|---|---|
| JP | 2005-128015 A | 5/2005 | |
| JP | 2009-139186 A | 6/2009 | |

* cited by examiner

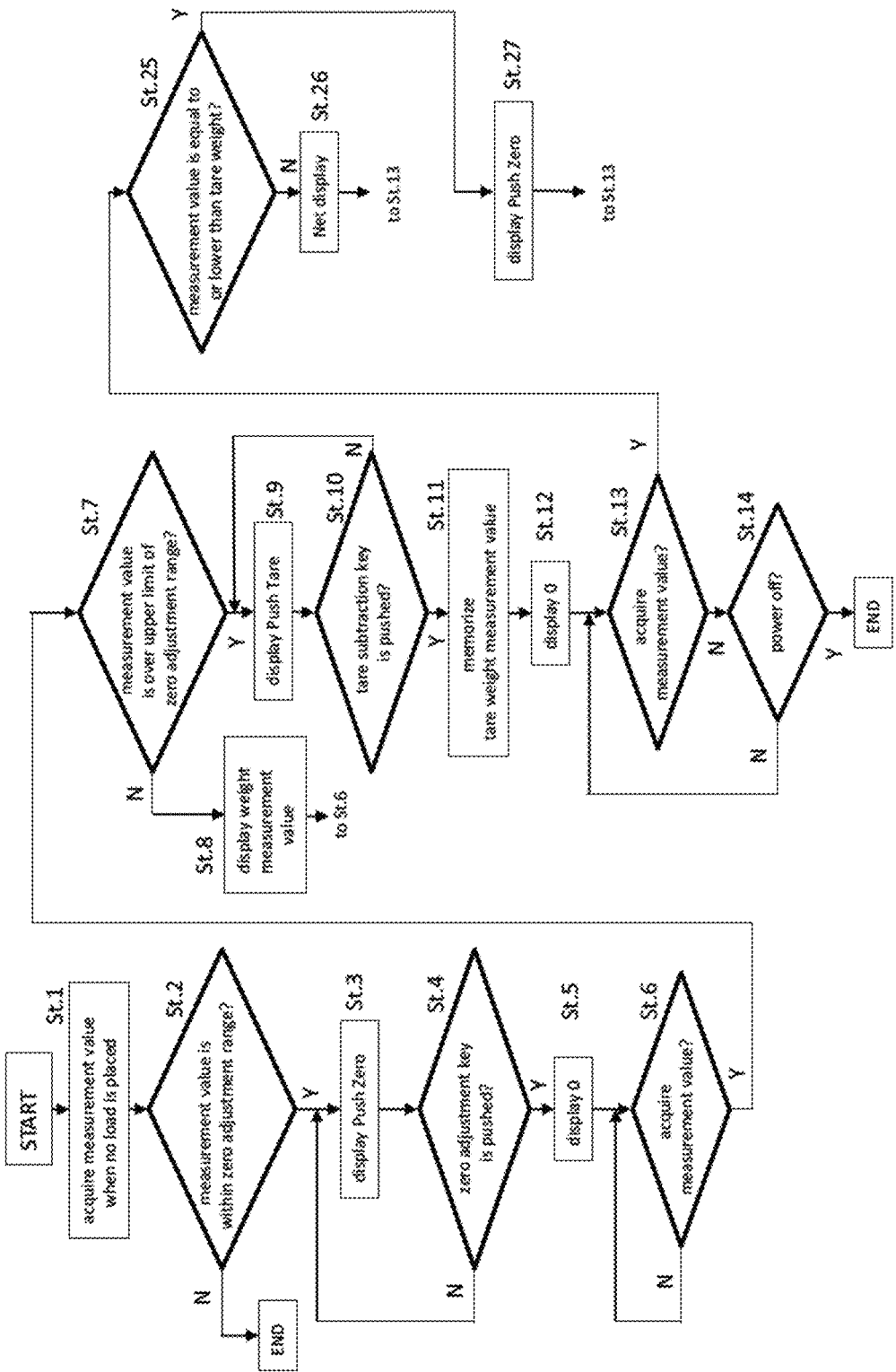

ELECTRONIC SCALE AND DISPLAY METHOD OF DISPLAY UNIT THEREOF

TECHNICAL FIELD

The present invention relates to an electronic scale provided with a tare subtraction key and a zero adjustment key and also a display method of the display unit thereof capable of preventing weighing errors due to forgetting to push tare subtraction and/or zero adjustment keys.

BACKGROUND ART

Conventional electronic scales are provided with keys for performing tare weight subtraction from the actual weight of a load to be weighed and zero adjustment as disclosed in the Patent Document 1 below.

The zero adjustment key is pushed to make the display equal to zero when no load to be weighed is placed on a weighing dish. On the other hand, the tare subtraction key is pushed when only a container is placed on the weighing dish for memorizing the weight thereof. When weighing load placed in the container thereafter, displayed is the net weight of the load by subtracting the weight of the container.

PRIOR ART

Patent Document

Patent Document 1: JP2005-128015 A

SUMMARY OF THE INVENTION

Problem to be Solved by the Invention

However, there is a possibility for workers who are not well trained for weighing operations forget to push the tare subtraction key and/or the zero adjustment key. Such errors may lead to serious consequences in reliability or safety of products, especially in medical and chemical fields, foods and beverage fields and the like.

In consideration of the above circumstance, the present invention is made to provide an electronic scale capable of preventing the worker from forgetting to push the tare subtraction key and/or the zero adjustment key and also to provide a display method of the scale display unit thereof.

Means to Solve the Problem

The present invention is an electronic scale comprising a display unit for digitally displaying the weight of any load placed on the weighing dish and a tare subtraction key, further comprising a display control unit for controlling the display on the display unit; and a memory for memorizing as a zero adjustment range a scope of weight for making the display on the display unit to zero when a key for instructing the zero adjustment is pushed under the condition of no load on the weighing dish, wherein the display control unit is capable of displaying a tare subtraction prompt display on the display unit to prompt the worker to push the tare subtraction key when the weighing value of the load increases a predetermined value above the upper limit of the zero adjustment range.

The tare subtraction prompt display appearing on the display unit enables to prevent the worker from forgetting to push the tare subtraction key.

Also, in the electronic scale of the present invention, it is possible that the tare weight is memorized in a memory at the time of pushing the tare subtraction key so that the display control unit displays the tare subtraction prompt display when the weight decreases lower then the tare weight.

After setting the tare subtraction, the display unit displays a certain minus value when the container is removed, thereby giving the worker discomfort feeling. However, a tare subtraction prompt display is displayed in the electronic scale of the present invention, thereby dissolving such discomfort feeling.

Also, in the electronic scale of the present invention, if weight measurement is in excess of the tare weight while the tare subtraction prompt display, it is possible that the display control unit stops the tare subtraction prompt display and displays on the display unit a value that is equal to subtraction of the tare weight from the measurement value.

This enables to avoid the need for repeatedly pushing the tare subtraction key when repeatedly weighing different amounts of loads by placing on the same container.

Also, in the electronic scale of the present invention, it is preferable that a zero adjustment key is provided for instructing the zero adjustment of the display unit separately from the tare subtraction key.

Although the tare subtraction key and the zero adjustment key are common in that the display on the display unit becomes zero when they are pushed, the display becomes zero by pushing the zero adjustment key only when the measurement value is within the zero adjustment range. This is the difference from the tare subtraction key.

Also, in the electronic scale of the present invention, when the weight measurement is within the scope of the zero adjustment range, the display control unit displays on the display unit the zero adjustment prompt display for prompting the worker to push the zero adjustment key.

This ensures to prevent the worker from forgetting to push the zero adjustment key.

Additionally, the present invention is a display method on a display unit of an electronic scale comprising a display unit for digitally displaying the weight of a load placed on the weighing dish and a tare subtraction key, comprising the steps of:

memorizing in a memory as a zero adjustment range a range of weight for making the display on the display unit to zero at the time of pushing a key for instructing the zero adjustment when no load is placed on the weighing dish; and displaying on the display unit a tare subtraction prompt display for prompting to push the tare subtraction key when detecting any weight measurement value increasing over the upper limit of the zero adjustment range by a predetermined value.

The tare subtraction prompt display prevents the worker from forgetting to push the tare subtraction key.

Also, in the display method for an electronic scale of the present invention, the tare weight at the time when the tare subtraction key is pushed is memorized in a memory, and the tare subtraction prompt display can be displayed on the display unit when the weight measurement is lower the tare weight.

It is possible to dissolve any discomfort feeling of displaying minus value on the display unit.

Also, in the display method for an electronic scale of the present invention, when weight measurements increase over the tare weight while the tare subtraction prompt display is on, it is possible that the tare subtraction prompt display is stopped and the net weight of the load is displayed on the display unit by subtracting the tare weight from the measurement value.

This enables to eliminate the need for repeatedly pushing the tare subtraction key when repeatedly measuring different amounts of load using the same container.

Also, in the display method for an electronic scale of the present invention, a zero adjustment prompt display for prompting to operate a key for instructing zero adjustment can be displayed on the display unit when the weight measurement is within the scope of the zero adjustment range.

This enables to prevent the worker from forgetting to push the zero adjustment key.

Advantage of the Invention

According to the present invention, it is possible to prevent the worker from forgetting to push the tare subtraction key and/or the zero adjustment key in weighing operations and thus avoiding any measurement errors to occur even if untrained workers engage with the weighing operations.

BRIEF DESCRIPTION OF DRAWINGS

FIG. 13 is a flowchart for showing CPU processes to execute the mode 2.

EMBODIMENT OF THE INVENTION

Figure 1:
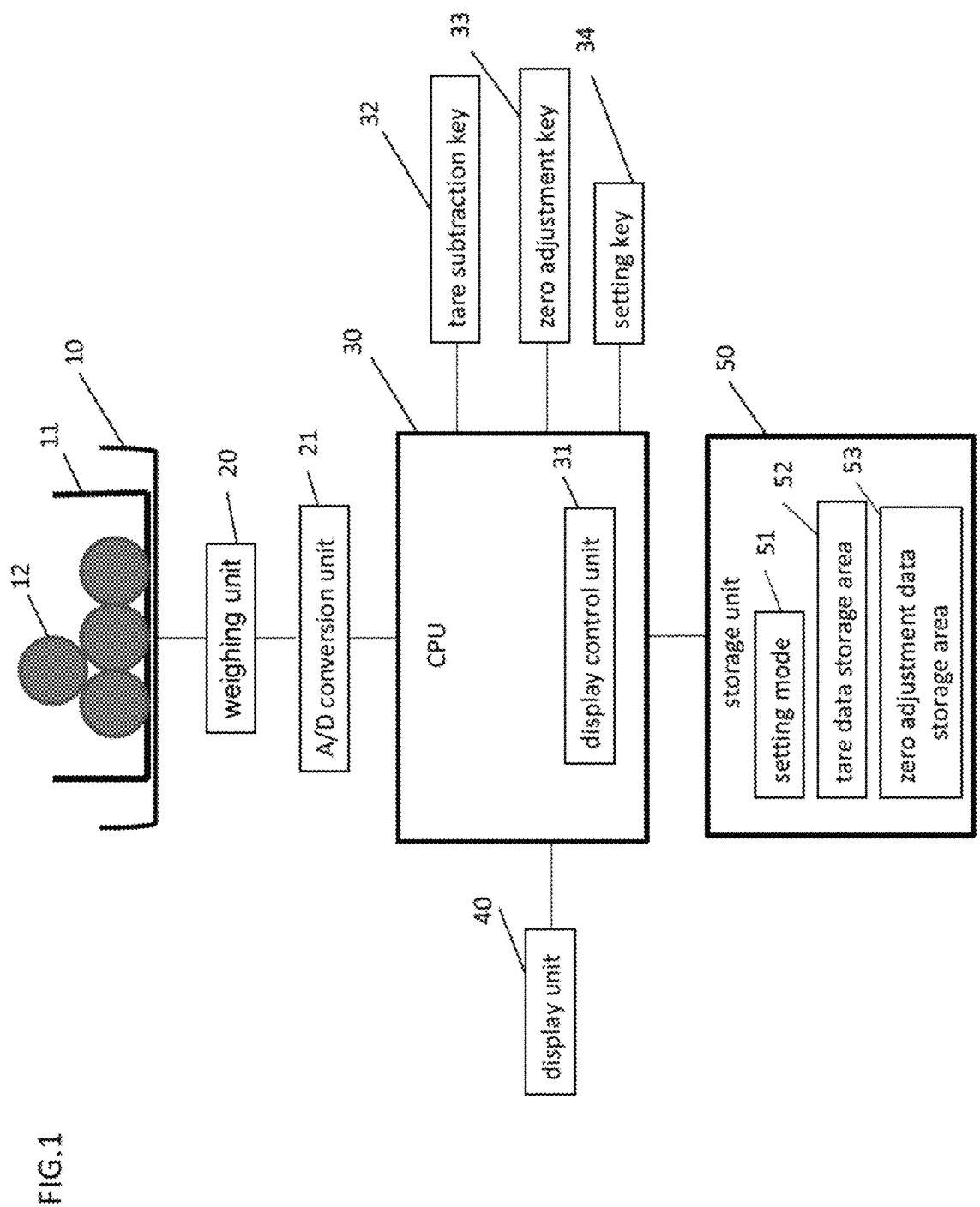
FIG. 1 is a diagrammatic view to show the construction of an embodiment of the electronic scale according to the present invention.

FIG. 1 is a diagrammatic illustration of the construction of the electronic scale according to an embodiment of the present invention.

The electronic scale comprises a weighing unit 20 for outputting analog quantity corresponding to the weight of objects (a container 11 and a load 12) to be weighted and placed on a weighing dish 10, an A/D conversion unit 21 for converting an analog quantity into a corresponding digital quantity, a CPU 30 for converting the weight detected by the weighing unit 20 into a weight data and also for controlling the display, an display unit 40 for executing the display, a tare subtraction key 32 to be operated for zero display on the display unit 40 when a load is placed on the weighing dish 10, a zero adjustment key 33 to be operated for zero display on the display unit 40 when nothing is placed on the weighing dish 10, a setting key 34 to be operated for selecting desired functions of the scale, and a storage unit 50 for memorizing various data that are necessary for weighing processes.

The CPU 30 has a display control unit 31 for controlling the display on the display unit 40 in response to functions selected by the setting key 34 as well as operations of the tare subtraction key 32 and the zero adjustment key 33.

The display control unit 31 performs any processing as defined by programs in the CPU 30.

In addition, the storage unit 50 memorizes modes that are selected by the setting key 34 as a setting mode 51. In a tare data storage area 52 of the storage unit 50, a tare data is memorized when the tare subtraction key 32 is pushed. A zero adjustment data storage area 53 of the storage unit 50 memorizes in advance the data for designating a range (zero adjustment range) for making the display to zero in response to pushing of the zero adjustment key 33.

Figure 2:
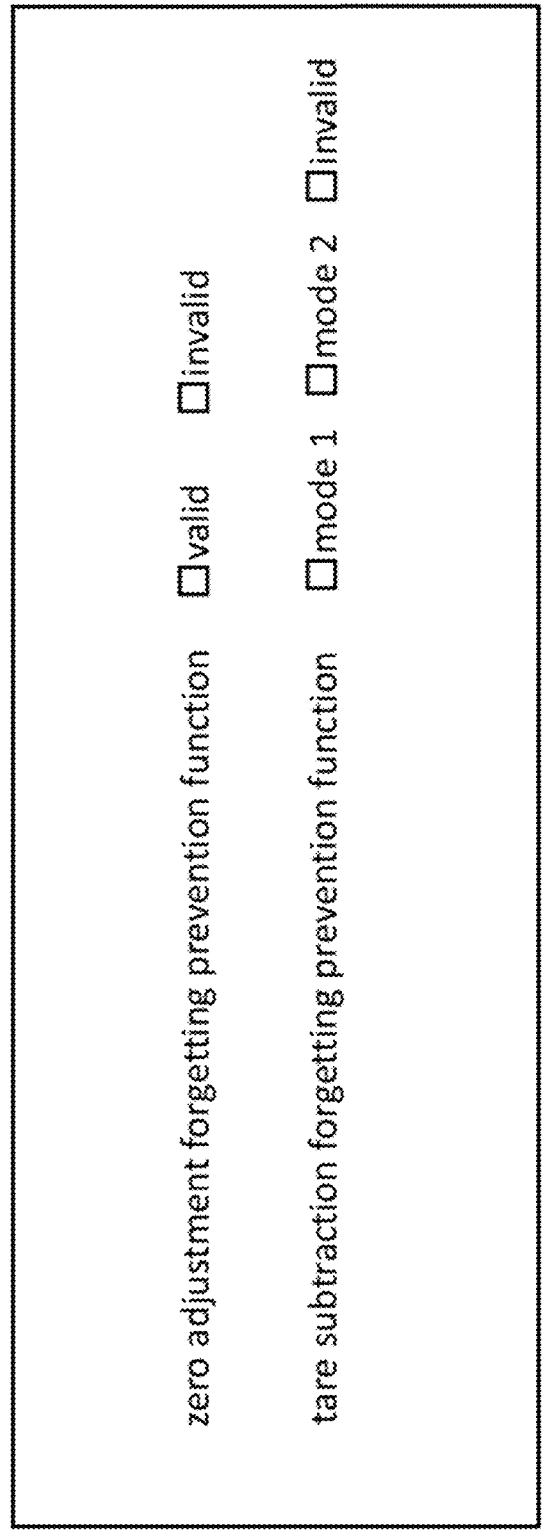
FIG. 2 is an illustration to show functions to be set by setting keys.

In the scale, as illustrated in FIG. 2, it is possible to select either valid/invalid of the zero adjustment forgetting prevention function and either mode 1/mode 2/invalid of the tare subtraction forgetting prevention function by operating the setting key 34.

Figure 3:
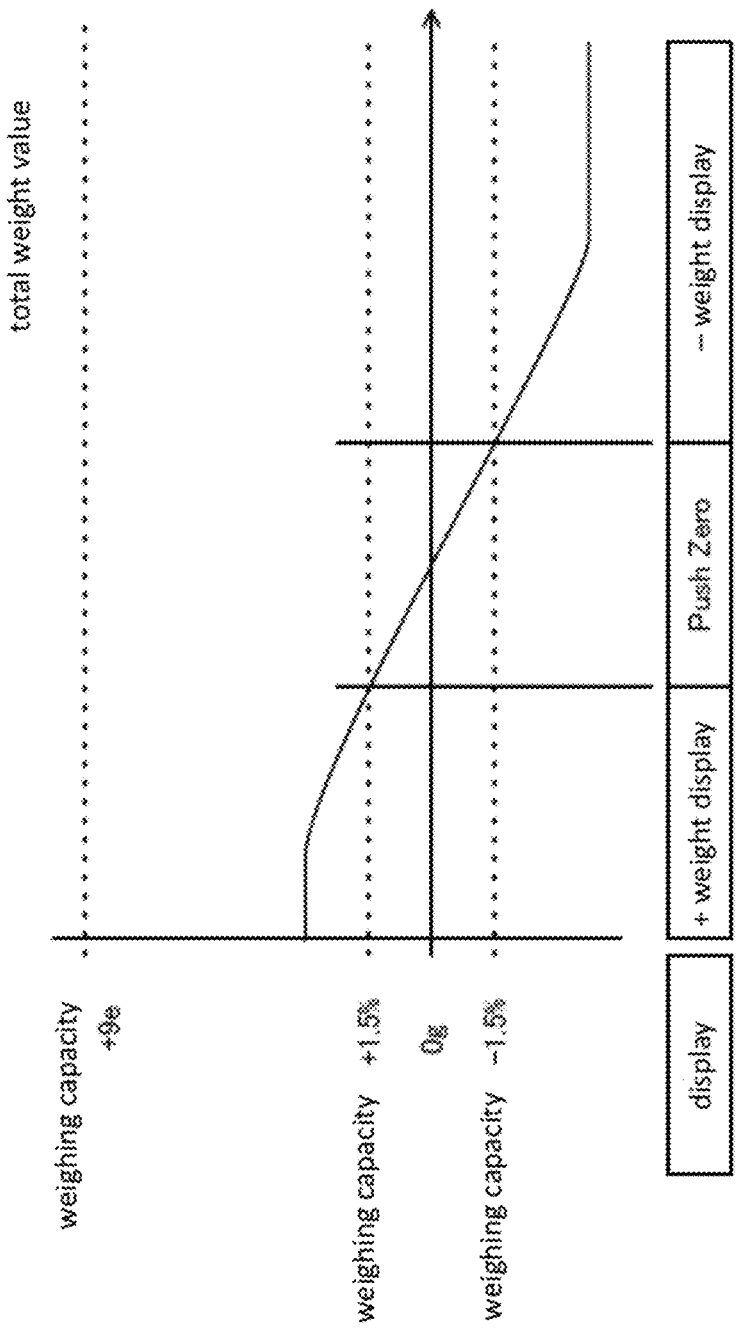
FIG. 3 is an illustration to explain a zero adjustment prevention function.
Figure 4:
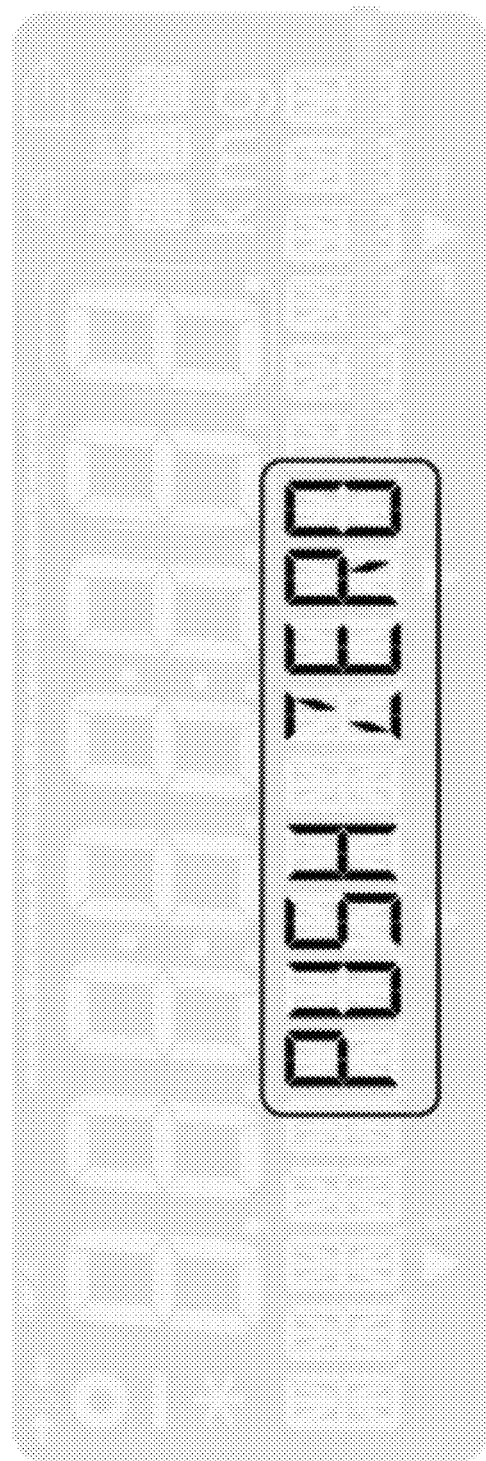
FIG. 4 is an illustration of a zero adjustment prompt display.

As shown in FIG. 3, if the zero adjustment forgetting prevention function is valid, displayed on the display unit 40 is a display (zero adjustment prompt display) to prompt pushing of the zero adjustment key 33 when the weight measurement value falls between +1.5% and −1.5% of the weighing capacity. Specifically, a PUSH ZERO display is displayed in blinking as shown in FIG. 4.

The scope between +1.5% and −1.5% of the weighing capacity is the zero adjustment range of the scale. If the zero adjustment key 33 is pushed when the weight measurement value falls in the zero adjustment range, the display control unit 31 sets the display on the display unit 40 to zero.

Figure 5:
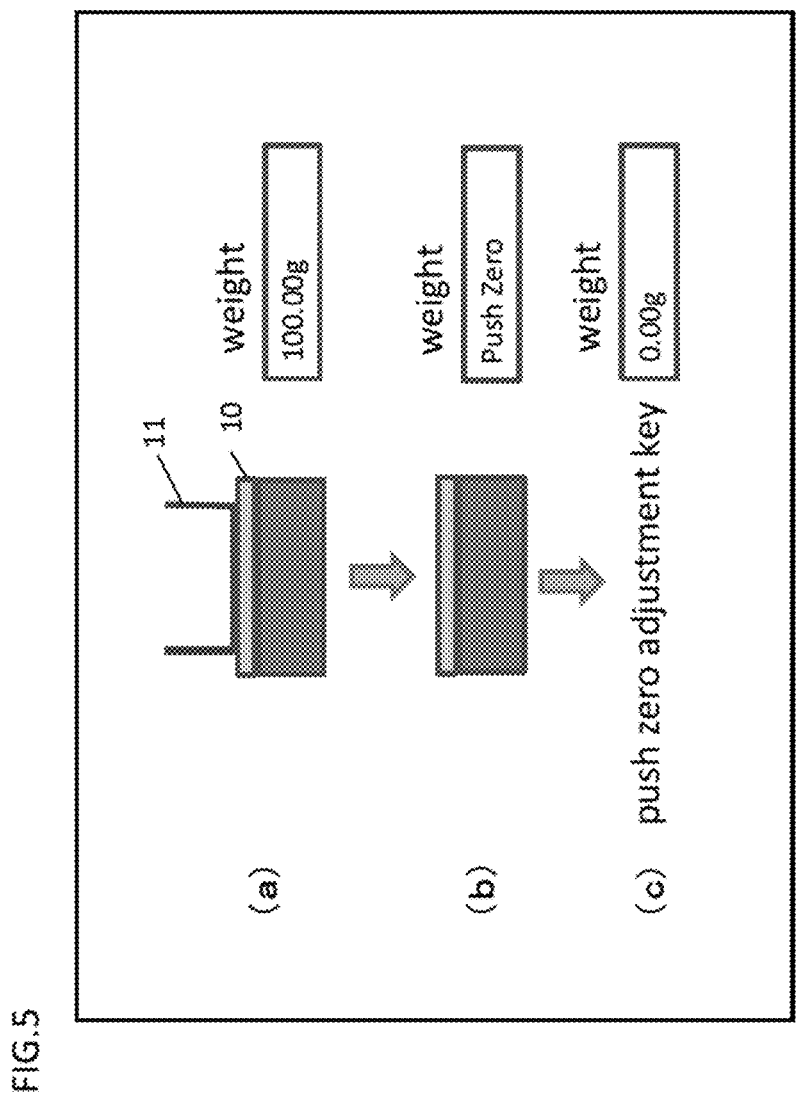
FIG. 5 shows transitions of displays on a display unit as a result of the zero adjustment.

FIG. 5 shows the relationship between the load on the weighing dish 10 and the display on the display unit 40 in particular conditions.

(a) When the container 11 is placed on the weighing dish 10, the weight of the container 11 is displayed on the display unit 40.

(b) When the container 11 on the weighing dish 10 is removed, PUSH ZERO is displayed on the display unit 40 in blinking.

(c) When the zero adjustment key 33 is pushed by the worker, zero is displayed on the display unit 40.

As understood from the foregoing, blinking display of PUSH ZERO helps to prevent the worker from forgetting the pushing of the zero adjustment key 33.

Figure 6:
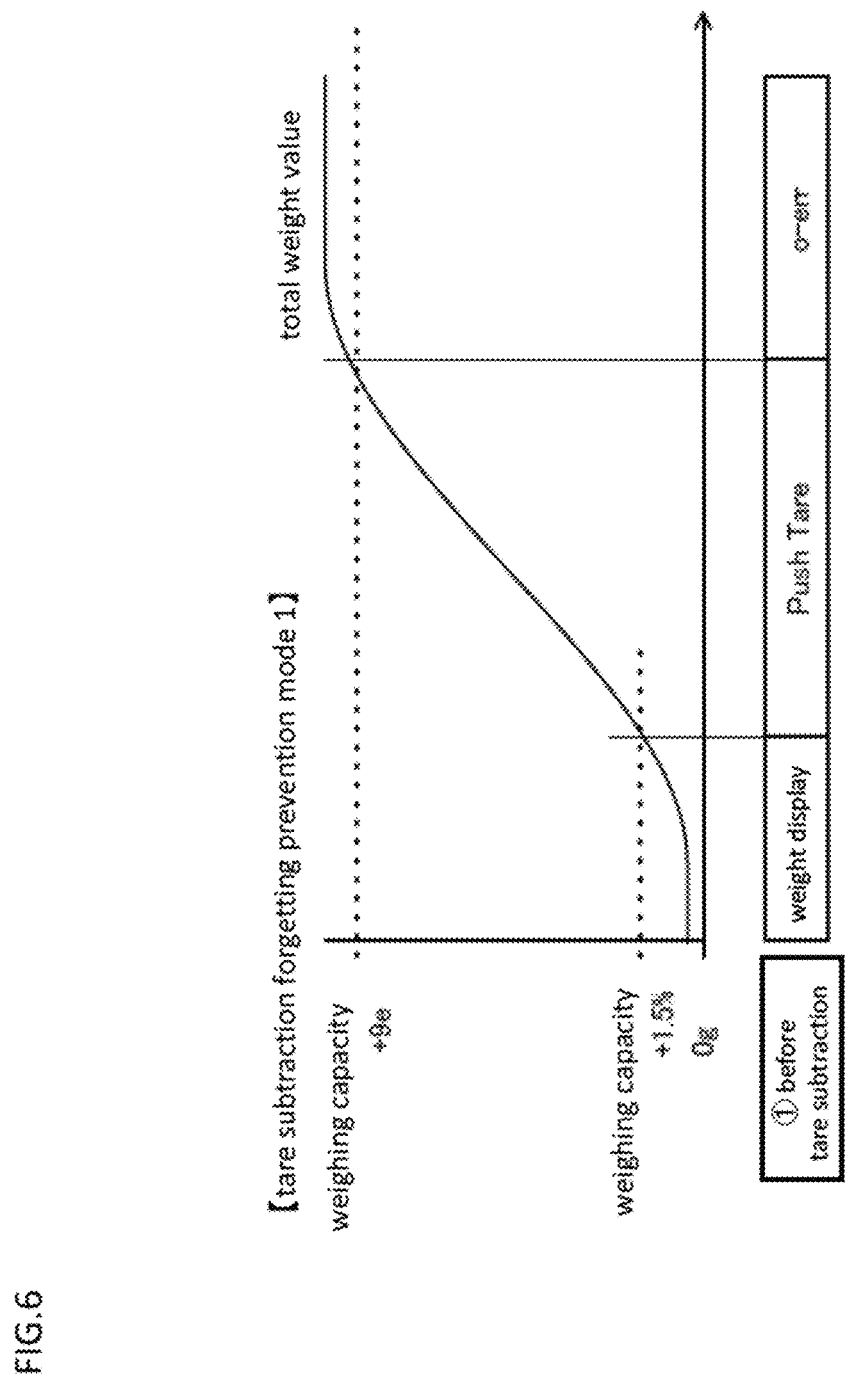
FIG. 6 is a drawing for explaining a tare subtraction forgetting prevention function.
Figure 7:
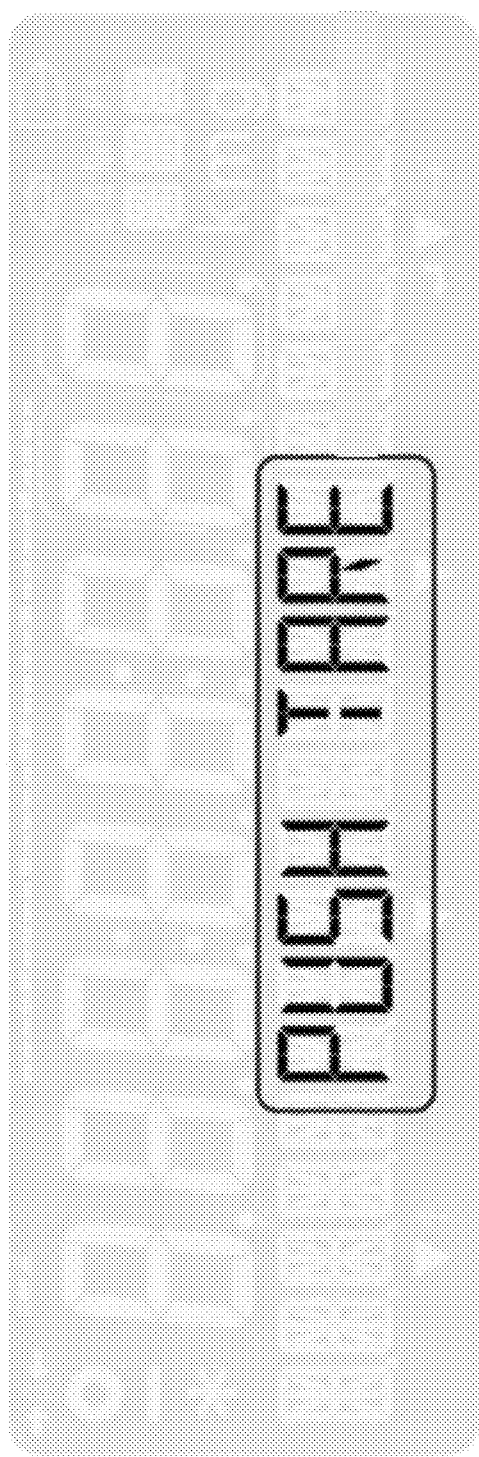
FIG. 7 is an illustration of a tare subtraction prompt display.

On the other hand, as shown in FIG. 6, if the mode 1 of the tare subtraction forgetting prevention function is chosen, a display for prompting the pushing of the tare subtraction key 32 (tare subtraction prompt display) is displayed on the display unit 40 when a load is placed on the weighing dish 10 and the weight measurement value starts to increase in excess the upper limit of the zero adjustment range (1.5% of the measuring capacity). Specifically, a PUSH TARE display blinks as shown in FIG. 7.

Figure 8:
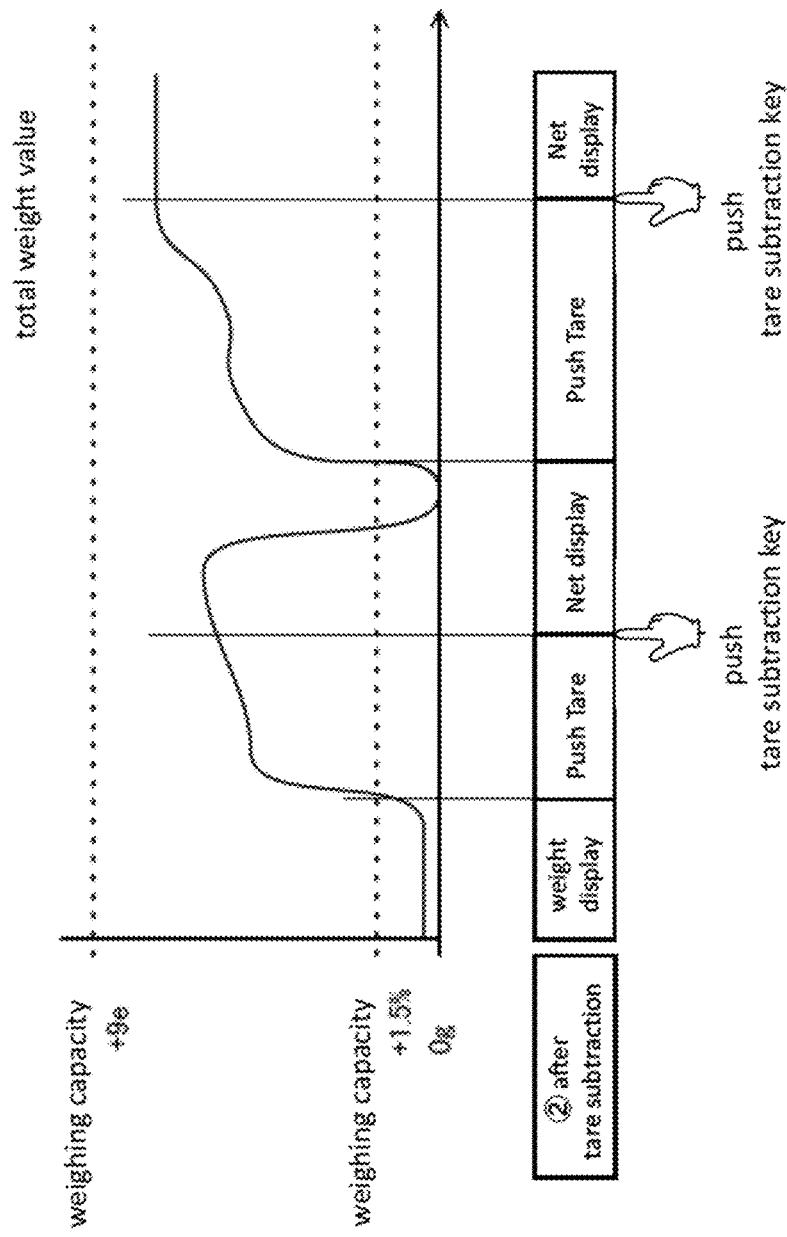
FIG. 8 is a drawing for explaining a mode 1 of the tare subtraction forgetting prevention function.

If the load weight on the weighing dish 10 exceeds the weighing capacity, an error message is displayed on the display unit 40 (FIG. 6). If the load weight does not exceed the weighing capacity, the display on the display unit 40 is switched from blinking PUSH TARE to zero when the tare subtraction key 32 is pushed after stabilizing of the weight measurement value as shown in FIG. 8 and the load measurement value at that time is recorded in the tare data storage area 52 of the storage unit 50 as the tare weight.

Displayed on the display unit 40 thereafter is the display of the total weight on the weighing dish 10 minus the tare weight (Net display).

As a result, if the load on the weighing dish 10 is completely removed, the tare weight is displayed in minus on the display unit 40.

Then, if a load is placed again on the weighing dish 10, PUSH TARE is displayed on the display unit 40 because the weight measurement increases in excess the upper limit of the zero adjustment range. When the tare subtraction key 32 is pushed after the weight measurements are stabilized, the display is switched from blinking PUSH TARE to zero. And the weight measurement value at that instance is recorded in the tare storage area 52 in the storage unit 50 as the tare weight. Displayed on the display unit 40 thereafter are Net values that are equal to the total weights of the load on the weighing dish 10 minus the tare weight.

Figure 9:
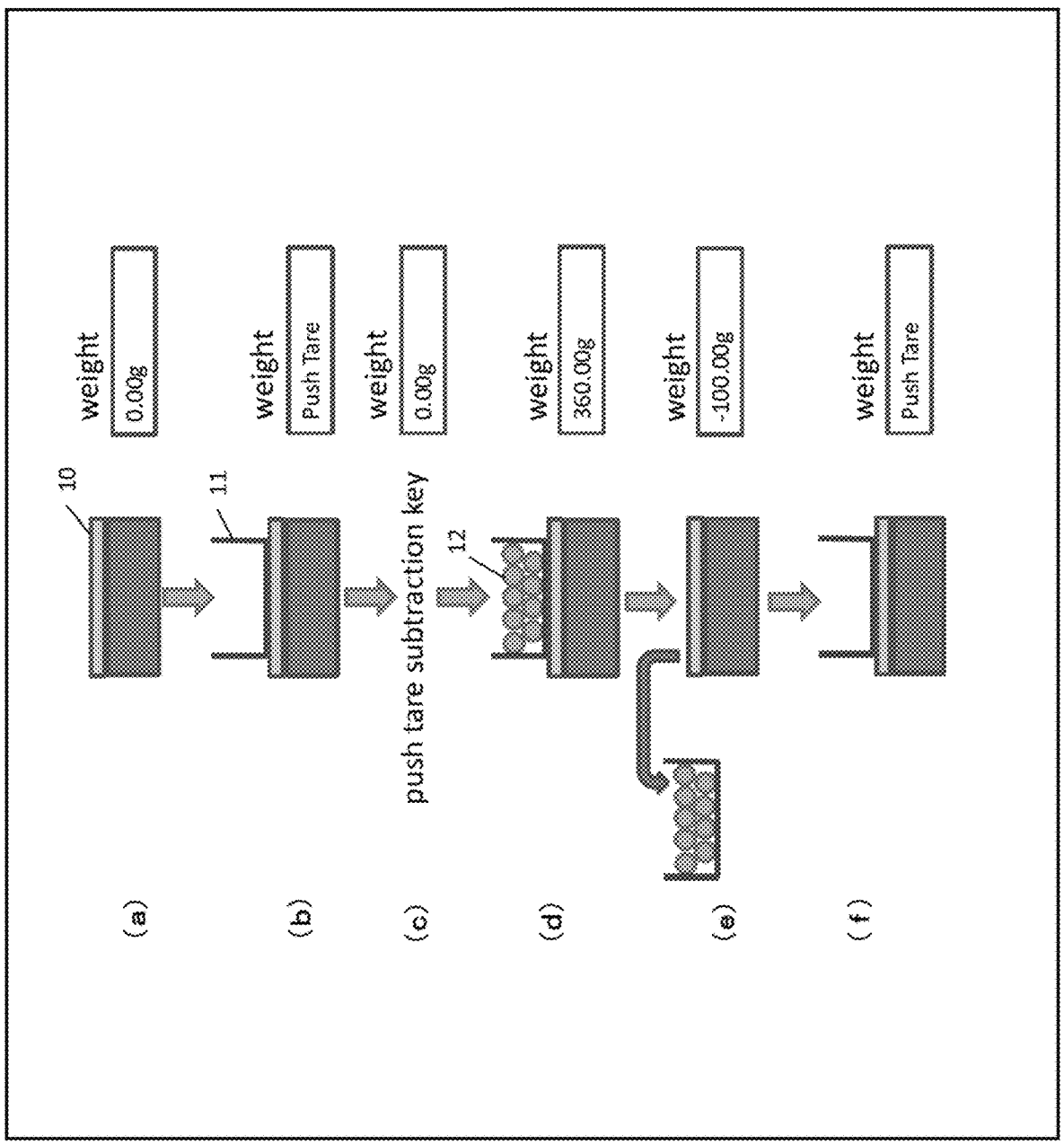
FIG. 9 illustrates transitions of the display on the display unit in the mode 1.

FIG. 9 illustrates the relationship between the load on the weighing dish 10 and the display on the display unit 40 in the mode 1.

(a) In the condition when no load is placed on the weighing dish 10, zero is displayed on the display unit 40.

(b) If the container 11 is placed on the weighing dish 10, PUSH TARE blinks on the display unit 40.

(c) If the worker pushes the tare subtraction key 32, zero is displayed on the display unit 40.

(d) If any load 12 is placed in the container 11 on the weighing dish 10, a net weight of the load 12 is displayed on the display unit 40.

(e) If the load 12 and the container 11 on the weighing dish 10 are removed, the weight of the container 11 is displayed on the display unit 40 in minus.

(f) If the container 11 is placed again on the weighing dish 10, PUSH TARE blinks on the display unit 40.

As described hereinabove, it is possible in the mode 1 to prevent the worker from forgetting to push the tare subtraction key 32 by the blinking display of PUSH TARE.

Figure 10:
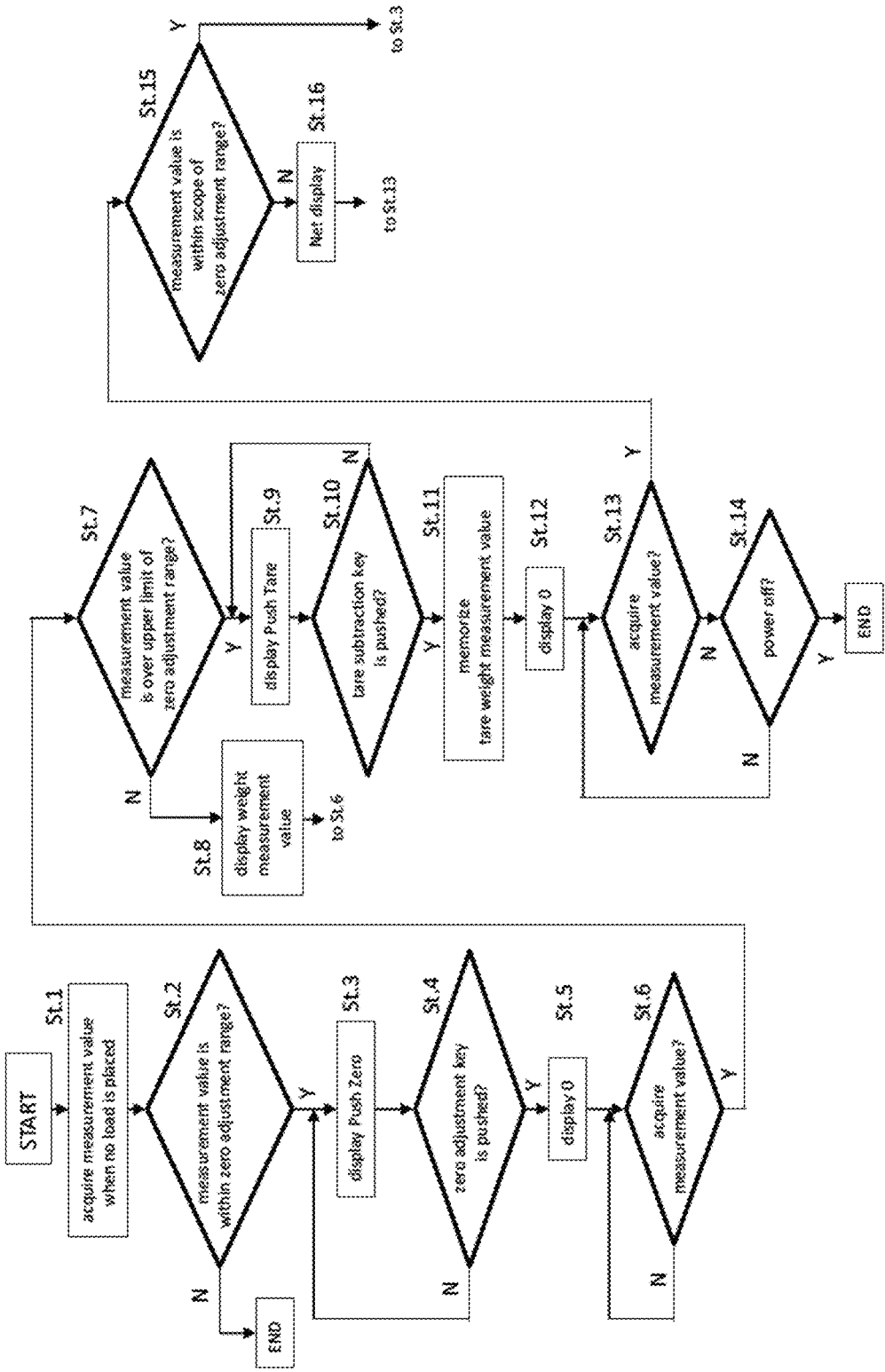
FIG. 10 is a flowchart for showing CPU processes to execute the mode 1.

The flowchart as shown in FIG. 10 illustrates operation procedures of the display control unit 31 in the condition when setting the zero adjustment forgetting prevention function and the mode 1 of the tare subtraction forgetting prevention function.

It is to be noted here that the following operation procedures are described on the premise that the weight of the total weight on the weighing dish 10 does not exceed the weighing capacity.

Acquired is the weight measurement value in the condition when nothing is placed on the weighing dish 10 (step 1). And judgment is made whether or not the measurement value is within the zero adjustment range as memorized in the zero adjustment data storage area 53 in the storage unit 50 (step 2). If the measurement value is outside the zero adjustment range (No in step 2), any further weighing operation is terminated to execute the scale adjustment operations. If the measurement value is within the zero adjustment range (Yes in step 2), PUSH ZERO is displayed in blinking on the display unit 40 (step 3). If the zero adjustment key 32 is pushed at this time (Yes in step 4), the display on the display unit 40 is switched from blinking to zero (step 5).

On acquiring any measurement value thereafter (Yes in step 6), judgment is made whether or not the measurement value exceeds the upper limit of the zero adjustment range (step 7). If it does not exceed (No in step 7), the weight indicated by the measurement value is displayed on the display unit 40 (step 8) and jumps to step 6.

If the measurement value exceeds the upper limit of the zero adjustment range (Yes in step 7), displayed on the display unit 40 is PUSH TARE in blinking (step 9). Then, if the tare subtraction key 32 is pushed (Yes in step 10), the tare weight indicated by the measurement value is saved in the tare data storage area 52 in the storage unit 50 (step 11), and the display on the display unit 40 is switched from the blinking PUSH TARE to zero (step 12).

Thereafter, if any measurement value is acquired (Yes in step 13), judgment is made if the measurement value is included in the zero adjustment range (step 15). If it is outside the zero adjustment range (No in step 15), displayed on the display unit 40 is the Net value that is equals to the measurement value minus tare weight (step 16) and then jumps to step 13. If the measurement value is within the zero adjustment range (Yes in step 15), it jumps to step 3.

On the other hand, if the power is turned off without acquiring any measurement value (Yes in step 14), the weight measurement process is terminated.

It is to be noted here that, if there is a possibility that the total weight to be placed on the weighing dish 10 exceeds the measuring capacity, a step to check if the acquired measurement value exceeds the measuring capacity is added next to the step 6 and the step 13, and an error message is displayed on the display unit 40 when the measurement value exceeds the measuring capacity.

Attention should be paid in the mode 1, when using the same container 11 and making repeated measurements by placing different loads in the container 11, it is necessary to push the tare subtraction key 32 whenever the same container 11 is placed on the weighing dish 10, thereby possibly increasing burden of the worker. Also, if both load 12 and container 11 are removed from the weighing dish 10, it is possible that minus value displayed on the display unit 40 gives discomfort feeling to untrained workers.

It is the mode 2 of the tare subtraction forgetting prevention function to improve such problem.

Figure 11:
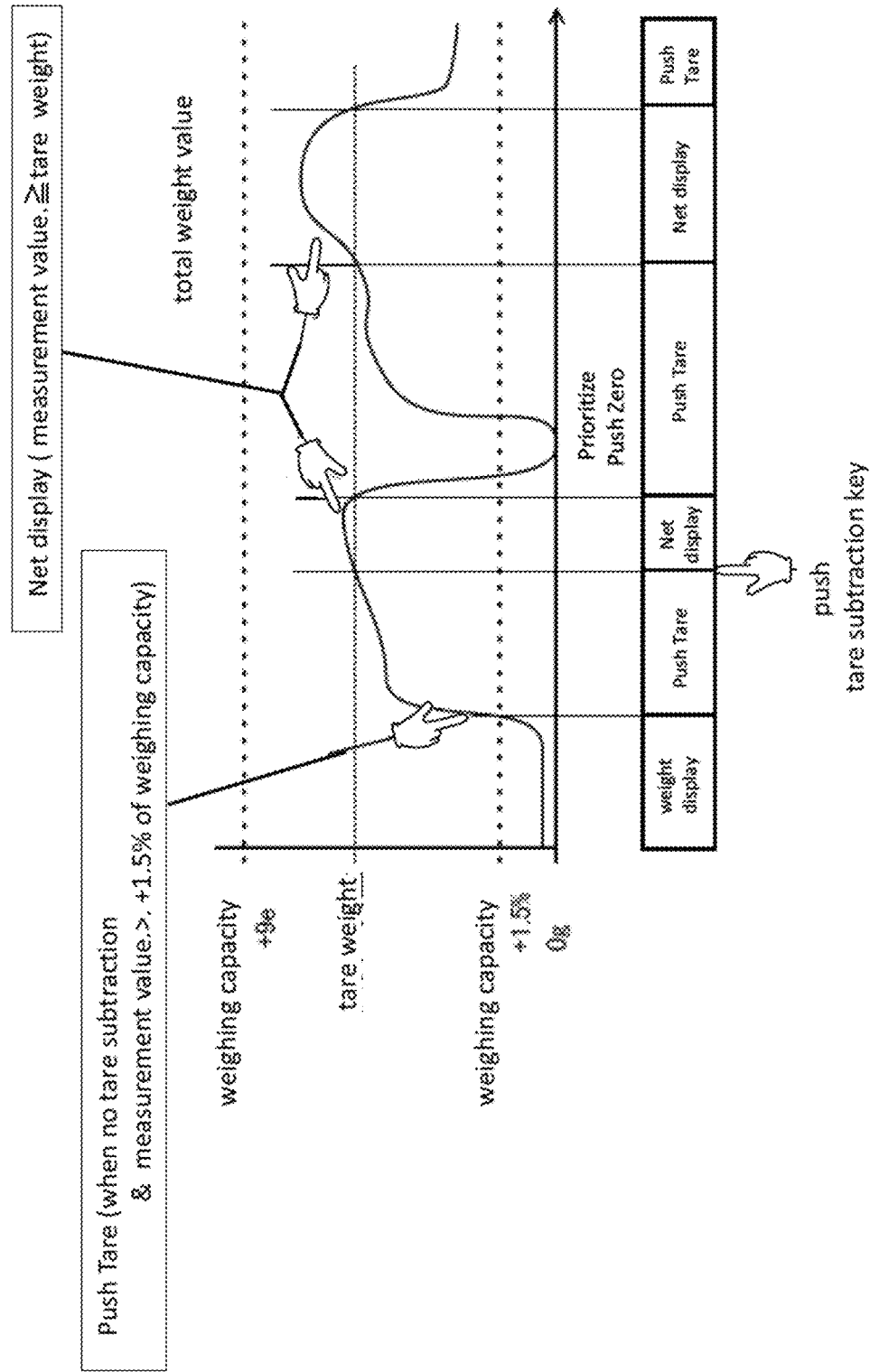
FIG. 11 is a drawing for explaining a mode 2 of the tare subtraction forgetting prevention function.

FIG. 11 shows a case of choosing the mode 2 of the tare subtraction forgetting prevention function.

It is to be noted here that PUSH TARE display blinks when the weight measurement value starts to increase in excess the upper limit of the zero adjustment range. When the tare subtraction key 32 is pushed, the display on the display unit 40 is switched from the blinking PUSH TARE to zero and the weight measurement value in that instance is recorded in the tare data storage area 52 in the storage unit 50 as the tare weight, and the Net display starts thereafter.

The above steps are no difference from the steps of mode 1.

In the mode 2, when the weight measurement value decrease less than the tare weight thereafter, PUSH TARE is displayed on the display unit 40. (It is to be noted herein that when both mode 2 and the zero adjustment forgetting prevention function are set, PUSH ZERO is displayed in priority.)

If the measurement value exceeds the tare weight while PUSH TARE display is being displayed, the display on the display unit 40 is switched to the Net display.

Accordingly, if the tare subtraction key 32 is pushed once, there is no need to push it thereafter.

Figure 12:
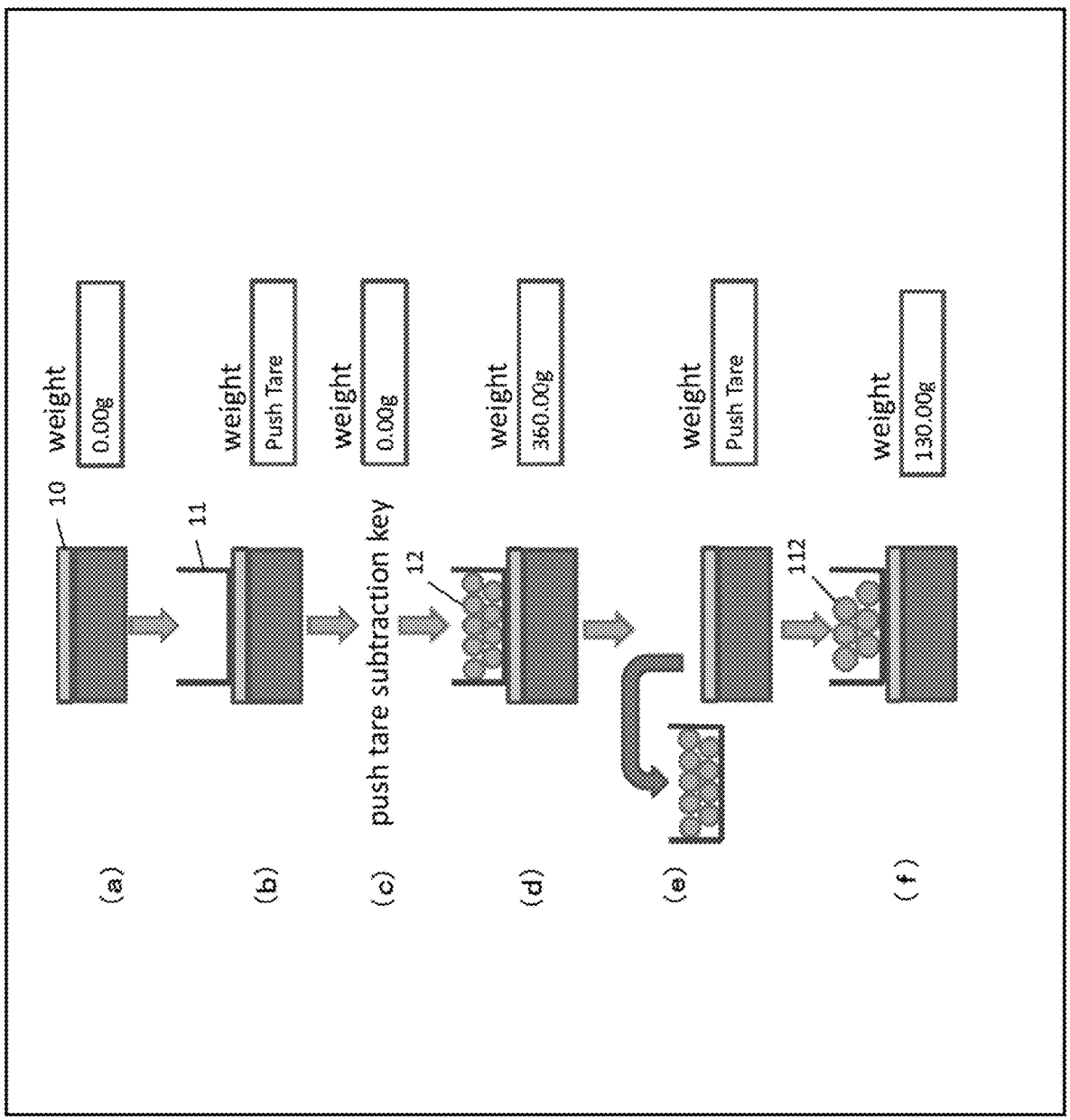
FIG. 12 illustrates transitions of the display on the display unit in the mode 2.

FIG. 12 illustrates the relationship between the load on the weighing dish 10 and the display on the display unit 40 in the mode 2.

(a) In the condition when there is nothing on the weighing dish 10, zero is displayed on the display unit 40.

(b) When the container 11 is placed on the weighing dish 10, PUSH TARE blinks on the display unit 40.

(c) When the worker pushes the tare subtraction key 32, zero is displayed on the display unit 40.

(d) If any load 12 is placed in the container 11 on the weighing dish 10, the net weight of the load 12 is displayed on the display unit 40.

(e) When both of the load 12 and the container 11 on the weighing dish 10 are removed, PUSH TARE blinks on the display unit 40.

(f) When different load 112 contained in the container 11 is placed on the weighing dish 10, the net weight of the load 112 is displayed on the display unit 40.

As understood from the above, in the mode 2, the blinking display of PUSH TARE enables to prevent the worker from forgetting to push the tare subtraction key 32 and also to eliminate the need for repeatedly pushing the tare subtraction key 32.

The flowchart in FIG. 13 illustrates operation procedures of the display control unit 31 when setting both the zero adjustment forgetting prevention function and the mode 2 of the tare subtraction forgetting prevention function.

In the flowchart, steps 1-14 are the same as those (FIG. 10) in the mode 1.

In step 13, when measurement value is acquired, it is judged weather the measurement value is less than the tare weight or not (step 25). If not less than the tare weight (No in step 25), the Net display subtracting the tare weight from the measurement value is displayed on the display unit 40 (step 26) and then jumps to step 13.

On the other hand, if the measurement value is less than the tare weight (Yes in step 25), PUSH ZERO blinks on the display unit 40 (step 27) and then jumps to step 13.

It is to be noted that if only the tare subtraction forgetting prevention function is set to the mode 2, PUSH TARE blinks in step 27.

The electronic scale of the present invention ensures to prevent the worker from forgetting to push the tare subtraction key and the zero adjustment key when weight measurement and effectively avoiding measurement errors to happen even in case untrained workers use the scale if an administrator sets the mode in advance using the setting key.

It is to be noted herein that the tare subtraction key and the zero adjustment key are provided separately. However, it is possible to use a single key having the both functions.

Although the electronic scale is provided with both zero adjustment forgetting prevention function and tare subtraction forgetting prevention functions, it is possible that the electronic scale is provided with only the tare subtraction forgetting prevention function.

Also, although PUSH TARE display blinks when weight measurement value exceeds the zero adjustment range, it is possible that such display is made when weight measurement value exceeds the upper limit of the zero adjustment range by a predetermined value.

INDUSTRIAL APPLICABILITY

Since the electronic scale of the present invention can prevent measurement errors due to forgetting of pushing the tare subtraction key and/or the zero adjustment key, it is possible to apply to various fields including medicinal and chemical fields, food and drink fields, etc.

DESCRIPTION OF REFERENCE NUMERALS

10 weighing dish
11 container
12 load
20 weighing dish
21 A/D conversion unit
30 CPU
32 tare subtraction key
33 zero adjustment key
34 setting key
40 display unit
50 storage unit
51 setting mode
52 tare data storage area
53 zero adjustment data storage area
112 load

The invention claimed is:

1. An electronic scale comprising a display unit for digitally displaying the weight of a load on a weighing dish and a tare subtraction key, further having:
    a display control unit for controlling the display on the display unit; and
    a memory for memorizing as a zero adjustment range a scope of weight for making the display on the display unit to zero when a key for instructing zero adjustment is pushed while no load is placed on the weighing dish;
    characterized in that the display control unit displays on the display unit a tare subtraction prompt display for prompting to push the tare subtraction key when the measurement value of the load increases over the upper limit of the zero adjustment range by a predetermined value.

2. An electronic scale of claim 1, wherein memorized in the memory is the tare weight at the time when the tare subtraction key is operated and the display control unit displays on the display unit the tare subtraction prompt display when the measurement value decreases below the tare weight.

3. An electronic scale of claim 2, wherein the display control unit stops the tare subtraction prompt display and displays on the display unit the value of the measurement value minus the tare weight when the measurement value increases over the tare weight while displaying the tare subtraction prompt display.

4. An electronic scale of claim 1, further comprising a zero adjustment key for instructing zero adjustment on the display unit separately from the tare subtraction key.

5. An electronic scale of claim 4, wherein the display control unit displays on the display unit a zero adjustment prompt display for prompting operation of the zero adjustment key when the weight measurement value is within the scope of the zero adjustment range.

6. A display method on a display unit of an electronic scale comprising the display unit for digitally displaying the weight of a load placed on a weighing dish and a tare subtraction key, comprising the steps of:
    memorizing in a memory as a zero adjustment range a range of weight for making the display on the display unit to zero at the time of pushing a key for instructing the zero adjustment when no load is placed on the weighing dish; and
    displaying on the display unit a tare subtraction prompt display for prompting to push the tare subtraction key when detecting any weight measurement value increasing over the upper limit of the zero adjustment range by a predetermined value.

7. A display method of the electronic scale of claim 6, wherein the tare weight at the time of pushing the tare subtraction key is memorized in the memory and displaying the tare subtraction prompt display on the display unit when the measurement value decreases below the tare weight.

8. A display method of the electronic scale of claim 7, wherein the tare subtraction prompt display is stopped and the measurement value minus the tare weight is displayed on the display unit when the measurement value increases over the tare weight while displaying the tare subtraction prompt display.

9. A display method of the electronic scale of claim 6, wherein a zero adjustment prompt display for prompting to instruct zero adjustment is displayed on the display unit when weight measurement value is within the scope of the zero adjustment range.

10. An electronic scale of claim 2, further comprising a zero adjustment key for instructing zero adjustment on the display unit separately from the tare subtraction key.

11. An electronic scale of claim 3, further comprising a zero adjustment key for instructing zero adjustment on the display unit separately from the tare subtraction key.

* * * * *